United States Patent [19]

Binford et al.

[11] Patent Number: 5,430,333

[45] Date of Patent: Jul. 4, 1995

[54] ENERGY GENERATING SYSTEM AND METHOD

[76] Inventors: Mark S. Binford; Thomas A. Binford, both of 2000 Old U.S. Hwy. 41, Kennesaw, Ga. 30144

[21] Appl. No.: 275,798

[22] Filed: Jul. 15, 1994

[51] Int. Cl.[6] .................. F03B 13/06; F03G 7/06; F04B 17/00

[52] U.S. Cl. ........................ 290/54; 60/527; 60/529; 290/42; 290/43; 290/53; 417/321; 417/545

[58] Field of Search .............. 60/527, 529; 290/42, 290/43, 53, 54; 417/321, 545

[56] References Cited

U.S. PATENT DOCUMENTS

| | | | |
|---|---|---|---|
| 3,403,238 | 9/1968 | Buehler et al. | 337/393 |
| 3,808,445 | 4/1974 | Bailey | 290/53 |
| 3,939,356 | 2/1976 | Loane | 290/54 |
| 4,018,547 | 4/1977 | Rogen | 417/321 |
| 4,084,375 | 4/1978 | Horvath | 60/496 |

FOREIGN PATENT DOCUMENTS

| | | | |
|---|---|---|---|
| 186368 | 10/1983 | Japan | 290/54 |
| 104983 | 4/1990 | Japan | 290/54 |
| 115573 | 4/1990 | Japan | 290/54 |
| 3515 | 4/1990 | WIPO | 290/54 |

OTHER PUBLICATIONS

55-Nitinol-The Alloy With A Memory: Its Physical Mettallurgy, Properties, and Applications; C. M. Jackson A. J. Wagner, and R. J. Wasilewski; N.A.S.A. Technology Utilization Office; 1972.

Miracle Metal; Kevin Sanders; pp. 93-96 of Science Digest, Oct. 1981.

*Primary Examiner*—A. D. Pellinen
*Assistant Examiner*—Robert Lloyd Hoover
*Attorney, Agent, or Firm*—Louis T. Isaf; James A. Witherspoon

[57] ABSTRACT

A plurality of inflation devices are linked to one another to form a loop that is movably restrained so that a segment of the loop is disposed at a lower reference location at the given depth in a first body of water, another segment of the loop is disposed at an upper reference location situated above the lower reference location, another segment of the loop extends along a first path that extends generally upward from the lower reference location to the upper reference location, and another segment of the loop extends along a second path that extends generally parallel to the first path and upward from the lower reference location to the upper reference location. At least a majority of the inflation devices occupying the first path are inflated with gas and at least a majority of the inflation devices occupying the second path are deflated so that inflation devices in the first path move upward and inflation devices in the second path move downward. While each inflation device is proximate to the upper reference location, it is deflated by a compression facility that employs a differential temperature to controllably "stroke" Nitinol. The traveling or movement of the inflation devices is utilized to elevate water that flows, under the force of gravity, through a hydroelectric generating facility that generates electricity.

6 Claims, 5 Drawing Sheets

ENERGY GENERATING SYSTEM AND METHOD

BACKGROUND OF THE INVENTION

The present invention relates generally to the field of energy generation, and more particularly the field of generating electricity.

A number of systems and methods for generating energy have been previously proposed and adopted. However, many of the present systems and methods for generating energy have disadvantages. Some of the present systems and methods generate waste material that is difficult to contain or dispose of. Other of the present systems and methods are too expensive or inefficient to acceptably operate. Still other of the present systems and methods are incapable of generating a generous amount of harnessable energy over an extended period of time.

There is, therefore, a need in the industry for a method and system for solving these and other related, and unrelated, problems.

SUMMARY OF THE INVENTION

Briefly described, the present invention includes a system and method for lifting a quantity of liquid and allowing the quantity of liquid to be drawn, under the force of gravity, through a hydroelectric generating facility to create electricity. Buoyant bodies are preferably employed, either directly or indirectly, to lift the liquid.

More particularly, a plurality of inflation devices are linked to one another to form a loop. The loop is movably restrained so that a segment of the loop is disposed at a lower reference location at a given depth in a first body of water, another segment of the loop is disposed at an upper reference location situated above the lower reference location, another segment of the loop extends along a first path that extends generally upward from the lower reference location to the upper reference location, and another segment of the loop extends along a second path that extends generally parallel to the first path and downward from the upper reference location to the lower reference location. At least a majority of the inflation devices occupying the first path are inflated with gas and at least a majority of the inflation devices occupying the second path are deflated so that inflation devices in the first path move upward and inflation devices in the second path move downward. In other words, depending upon the perspective, the loop generally rotates in a clockwise direction. While each inflation device is proximate to the upper reference location, it is deflated. While each inflation device is proximate to the lower reference location, it is inflated. Thus, the loop of inflation devices continues to travel.

The movement of the inflation devices is utilized to draw water from the first body of water to a second body of water that is elevated above the first body of water. The water is acceptably drawn, for example, by harnessing the movement of the loop to drive a pump or a bucket system, or the like. Alternately, each of the inflation buckets defines a chamber for capturing water such that water is lifted therewith. Water flows from the second body of water, under the force of gravity, through a hydroelectric generating facility, and then back to the first body of water for reuse. Electricity is produced by the hydroelectric generating facility.

As discussed above, each inflation devices is alternately inflated and deflated. In accordance with a first embodiment of the present invention, one inflation device is inflated at the same time another inflation device is deflated. Deflation is preferably carried out at a compression assembly as inflation devices pass thereby. The necessary compressive force is preferably generated by virtue of a differential temperature. More particularly, in accordance with the first embodiment of the present invention, the compression facility includes a pair of opposed arms that pivot toward one another to engage and compress an inflation device to drive the gas therefrom. The gas forced from the inflation device being deflated is directed to and employed to inflate the inflation device being inflated. The arms of the compression assembly are preferably driven by the differential temperature. The source of the warm dement of the differential temperature is acceptably solar, geothermal, or the like. The source of the cool element of the differential temperature is acceptably a lower stratum of a body of water or the like. The warm element and cool element are preferably alternately applied to Nitinol, or the like, to convert the differential temperature into mechanical energy that drives the arms of the compression assembly. Nitinol is a metal alloy that is disclosed in U.S. Pat. No. 3,403,238 which is expressly incorporated, in its entirety, herein by reference. Nitinol is also disclosed in a report entitled 55-Nitinol—The Alloy With A Memory: Its Physical Metallurgy, Properties, And Applications which was written by C. M. Jackson, H. J. Wagner, and R. J. Wasilewski under contract for NASA, which is expressly incorporated, in its entirety, herein by reference.

It is therefore an object of the present invention to seek to generate electricity in a pollution free manner.

Another object of the present invention is to harness and convert thermal energy into usable mechanical energy.

Yet another object of the present invention is to utilize a source of thermal energy that is nearly nonexpendable.

Still another object of the present invention is to draw water from the depths of a body of water.

Other objects, features and advantages of the present invention will become apparent upon reading and understanding this specification, taken in conjunction with the accompanying drawings.

DETAILED DESCRIPTION OF THE PREFERRED EMBODIMENTS

Figure 1:
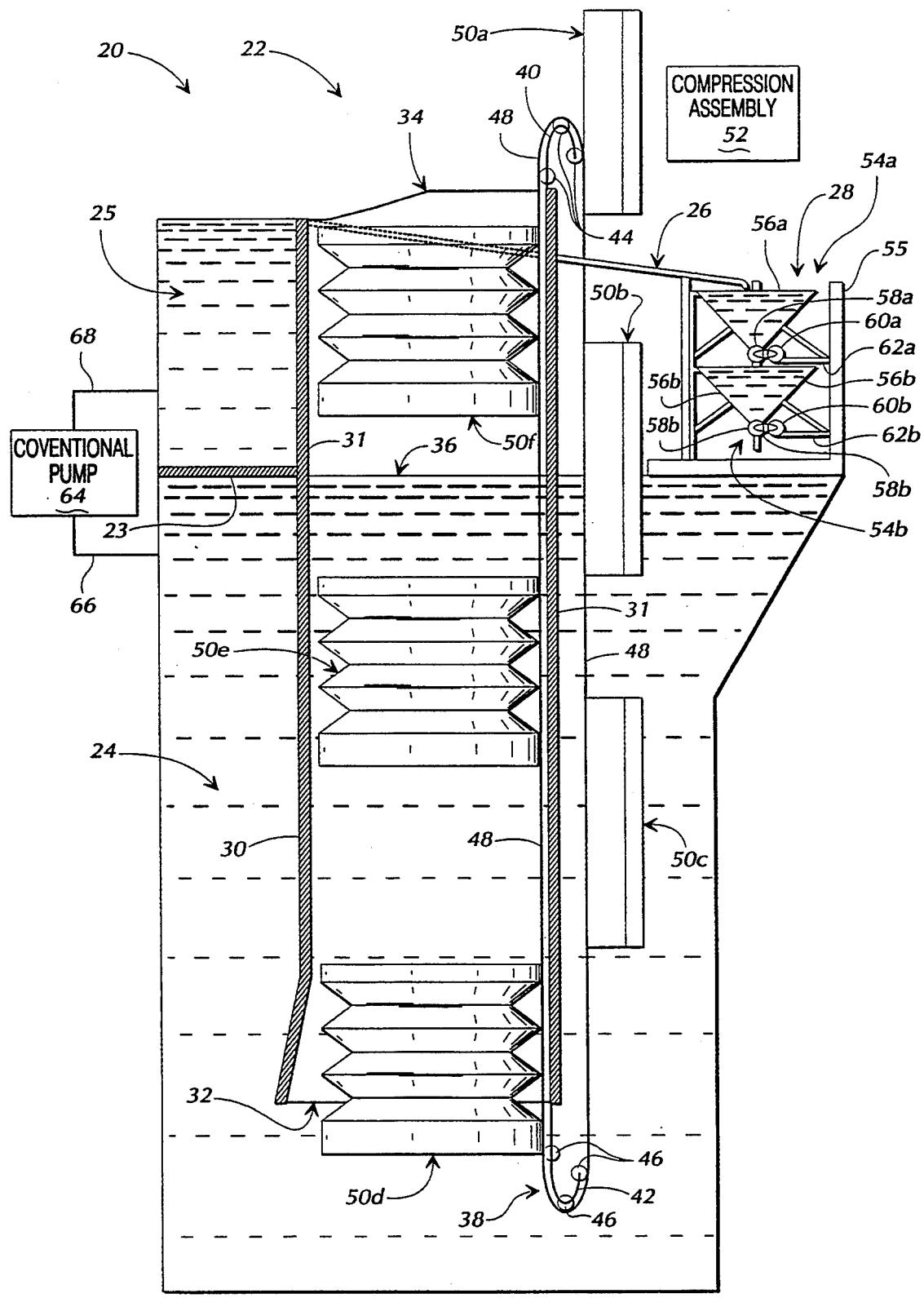
FIG. 1 is a schematic diagram of a portion of an energy generating system in accordance with a first embodiment of the present invention.

Referring now in greater detail to the drawings, in which like numerals represent like components throughout the several views, FIG. 1 is a front view of an energy generating system 20 depicted in schematic form, in accordance with a first embodiment of the present invention. The energy generating system 20 includes a lift reactor 22 that functions to provide a lifting force that is employed to transport liquid (which is represented by broken lines that extend horizontally and are off-set) from a holding pond 24 to an elevated pond 25, as will be discussed in greater detail below. The ponds 24,25 are separated by a barrier 23. The liquid flows under the force of gravity from the elevated pond 25, by way of a liquid delivery system 26 that acceptably includes a sluice or the like, to a hydroelectric generating facility 28 where electricity is generated. A portion of the delivery system 26 is depicted, with broken lines, as extending behind an inflation device 50f, which is discussed in greater detail below. The liquid is discharged from the hydroelectric generating facility 28 back into the holding pond 24 for reuse.

The lift reactor 22 preferably includes a pipe 30 that is oriented vertically within the holding pond 24. The front portion of the pipe 30 has been cut-away in FIG. 1 so that components are seen passing through the pipe 30, as will be discussed below. The pipe 30 includes a wall 31 that defines a pipe inlet 32 in the depths of the holding pond 24 and a pipe outlet 34 that is preferably displaced above a surface 36 of the holding pond 24. The pipe inlet 32 is preferably flared such that it defines a larger diameter than the remainder of the pipe 30. The lift reactor 22 further includes a vertical drive system 38 that provides a controlled travel path into the pipe inlet 32, through the interior of the pipe 30, out of the pipe outlet 34, and then along the exterior of the pipe 30 and back into the pipe inlet 32. The depicted vertical drive system 38 includes an upper lip 40 and a lower lip 42 that extend from the pipe outlet 34 and the pipe inlet 32, respectively. A plurality of rollers 44 are mounted to the upper lip 40 and a plurality of rollers 46 are mounted to the lower lip 42. A continuous loop member 48 extends through the interior of the pipe 30, engages and rides around the rollers 44, extends along the exterior of the pipe 30, and engages and rides around the rollers 46 to define a continuous loop that is movable with respect to the pipe 30. In an alternate embodiment of the present invention, the pipe 30 is not employed, and another structure is employed to support the vertical drive system 38.

In accordance with the first embodiment of the present invention, a plurality of inflation devices 50 are linked to and travel with the loop member 48 into the pipe inlet 32, through the interior of the pipe 30, out the pipe outlet 34, along the exterior of the pipe 30, and back into the pipe inlet 32 in a repetitive fashion. The plurality of inflation devices 50 are spaced along the length of the loop member 48. In accordance with the first embodiment of the present invention, the exact number of inflation devices 50 will vary; however, the energy generating system 20 is depicted in FIG. 1 as including inflation devices 50a-f. In FIG. 1, inflation devices 50a-c are deflated whereas inflation devices 50d-f are inflated, as will be discussed in greater detail below. Regarding inflation and deflation of the inflation devices 50, the lift reactor 22 further includes a compression assembly 52, which is discussed in greater detail below. As depicted in FIG. 1, the compression assembly 52 is proximate to the top of the lift reactor 22. In another embodiment of the present invention, the compression assembly 52 is positioned just above the surface 36 of the holding pond 24 such that it can readily operate upon inflation devices 50 just prior to their entry into the holding pond 24.

As depicted in FIG. 1, the energy generating system 20 further includes a conventional pump assembly 64. The pump assembly 64 is intermediate to an intake pipe 66 and a discharge pipe 68. The pump assembly 64 draws water from the holding pond 24 through the intake pipe 66 and discharges water through discharge pipe 68 into the elevated pond 25. The pump assembly 64 is preferably driven by a shaft (not shown), or the like, that extends from one of the rollers 44. Alternately, the pump assembly 64 is driven by an electric motor (not shown) to which power is supplied, for example, by a wiring harnesses 62, which is discussed below.

Figure 2:
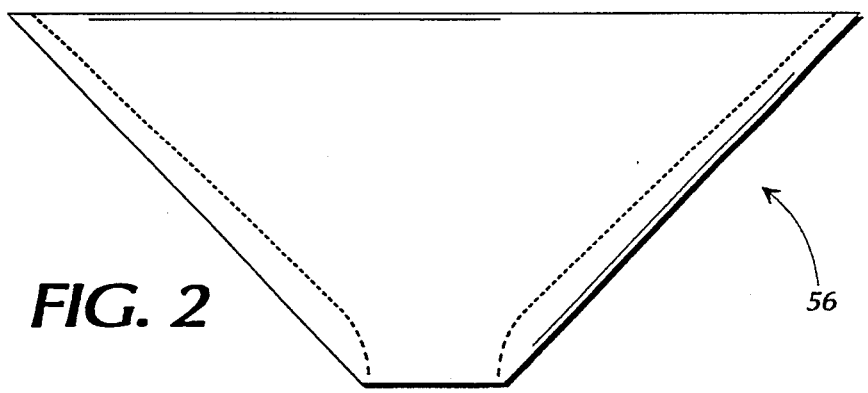
FIG. 2 is an isolated, representative, side elevational view of an acceptable intake reservoir of the energy generating system of FIG. 1.

As depicted in FIG. 1, the hydroelectric generating facility 28 includes a plurality of individual hydroelectric subfacilities 54, and a hydroelectric subfacility 54a is depicted upstream from a hydroelectric subfacility 54b. The subfacilities 54 are supported by a framed structure 55. In accordance with the first embodiment of the present invention, the hydroelectric subfacilities 54 are similarly constructed and arranged; therefore, the following discussion of the hydroelectric subfacility 54a is representative of the hydroelectric subfacility 54b. The hydroelectric subfacility 54a includes an intake reservoir 56a. The intake reservoirs 56 are depicted in FIG. 1 in the shape or form of a cone or funnel. The front portions of the intake reservoirs 56a have been cut-away in FIG. 1 to show the water therein. The liquid delivery system 26 discharges into the top of the intake reservoir 56a, and water flows out of an aperture at the bottom of the intake reservoir 56a into and through a water turbine 58a. The intake reservoirs 56 are acceptably shaped, for example and not limitation, in the form of a right circular cone or an inverted right pyramid, wherein, in the region of the aperture at the bottom of the intake reservoir 56, the intake reservoir 56 defines a nozzle-like shape. For example, and not limitation, FIG. 2 depicts a representative side elevational view of such an intake reservoir 56 in the general form of a right-circular cone. Referring back to FIG. 1, the water turbine 58a drives an electric generator 60a that provides electricity through a wiring harness 62a. The water that passes through the water turbine 58a discharges into the hydroelectric subfacility 54b. In other words, the water that discharges from the water turbine 58a flows into the intake reservoir 56b and then through its associated water turbine 58b. The water is then discharged into the holding pond 24 for reuse. In accordance with another embodiment of the present invention, only a single hydroelectric subfacility 54 is employed.

Figure 3:
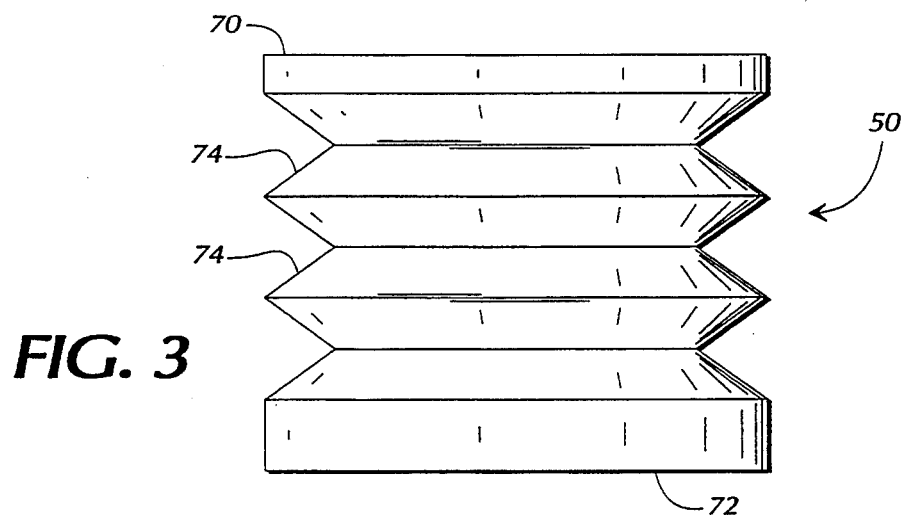
FIG. 3 is an isolated, representative, side elevational view of an inflation device of the energy generating system of FIG. 1.
Figure 4:
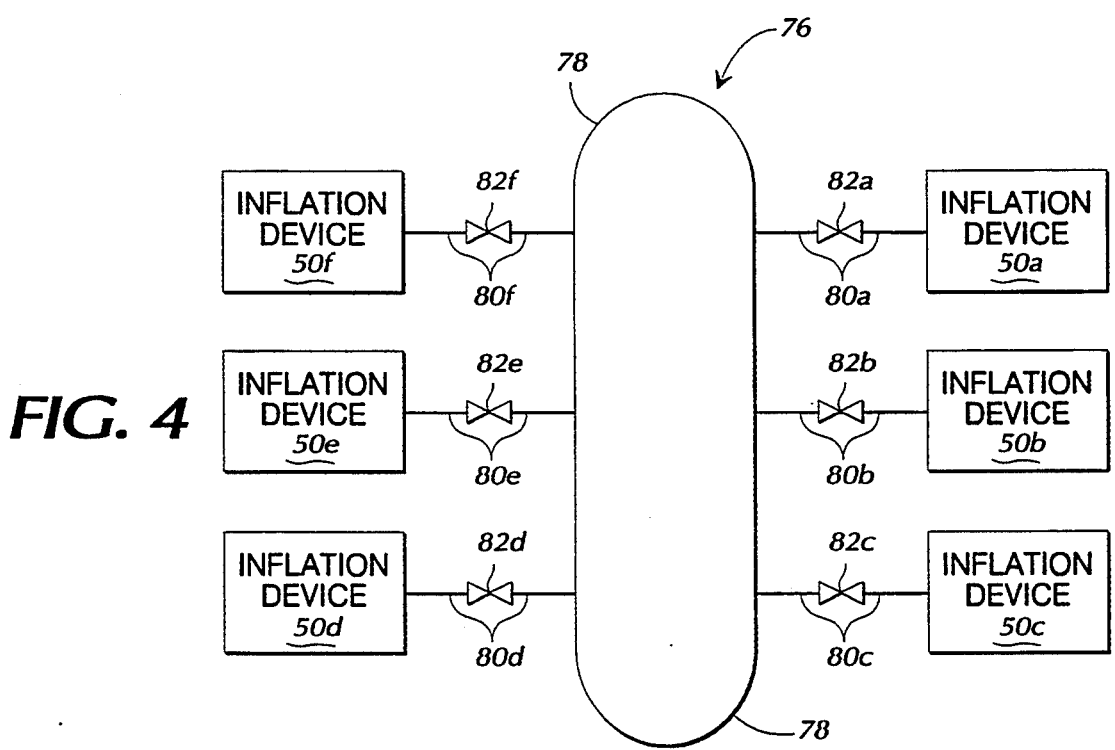
FIG. 4 is a pneumatic schematic depicting the communication between the inflation devices of the energy generating system of FIG. 1.

FIG. 3 is an isolated, representative, side elevational view of one of the inflation devices 50 of FIG. 1, in accordance with the first embodiment of the present invention. The inflation device 50 includes an upper face plate 70, a lower face plate 72, and a plurality of accordion-like sections 74 therebetween. It is believed that the face plates 70,72 of the inflation devices 50 are acceptably constructed, for example, from a plate of steel or aluminum, or the like, and that the accordion-like sections 74 are acceptably constructed, for example, from rubber belted with steel or other durable material such as that sold under the tradename of Kevlar, or the like. FIG. 4 is a pneumatic schematic depicting the inflation devices 50a-f and a pneumatic system 76 connected and providing gaseous communication therebetween, in accordance with the first embodiment of the present invention. The pneumatic system 76 depicted in FIG. 4 includes a primary pneumatic tube 78 that defines a loop. The primary tube 78 is preferably connected or integral to the loop member 48 (FIG. 1) such that it travels therewith. A plurality of secondary tubes 80a-f connect and provide communication between the inflation devices 50a-f, respectively, and the primary tube 78. A plurality of valves 82a-f are incorporated with and selectively provide flow through the secondary tubes 80a-f, respectively, as discussed in greater detail below.

Figure 5:
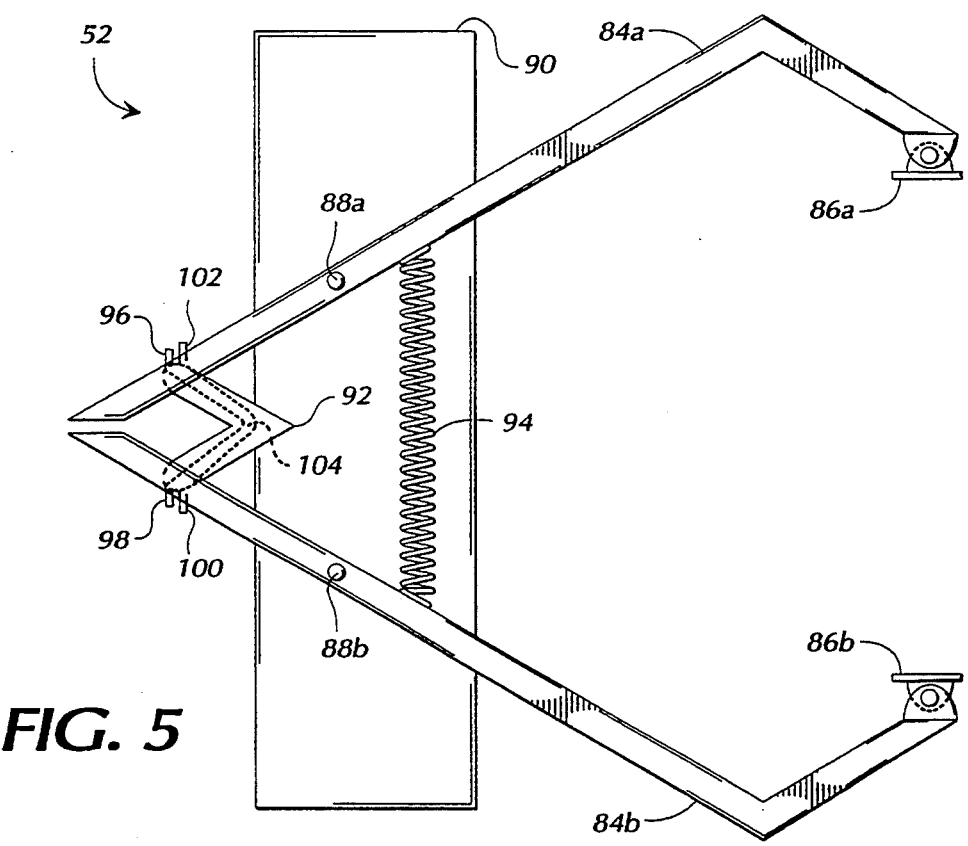
FIG. 5 is a side elevational view of a compression assembly of the energy generating system of FIG. 1.

FIG. 5 is a side elevational view of the compression assembly 52 (see also FIG. 1) in accordance with the first embodiment of the present invention. The compression assembly 52 is depicted in a ready configuration in FIG. 5. The compression assembly 52 includes a pair of opposed arms 84a,b that include engagement plates 86a,b at one end thereof. The engagement plates 86a,b engage the inflation devices 50, as discussed in greater detail below. The arms 84a,b are connected to and capably of pivoting with respect to pivot posts 88a,b, respectively, that protrude from a reference plate 90. A Nitinol tube 92 is disposed between and engages the ends of the arms 84a,b that are opposite from the engagement plates 86a,b. The Nitinol tube 92 is depicted in FIG. 5 in its bent or cooled configuration, whereby the compression assembly 52 is in the ready configuration. As discussed in greater detail below, when the Nitinol tube 92 is heated, it achieves a straightened configuration, thus driving the engagement plates 86a,b toward one another such that the compression assembly 52 is in a compressing configuration (not shown). A spring 94 is interposed between the arms 84 on the opposite side of the pivot posts 88 from the Nitinol tube 92, and the spring 94 is biased such that it tends to push the arms 84 away from each other. When the Nitinol tube 92 is heated and thereby straightened, the Nitinol tube 92 easily overcomes the force of the spring 94 to achieve the compressing configuration. However, when the Nitinol tube 92 is cooled and thereby bent, the spring 94 functions to assist in the returning the compression assembly 52 to the ready configuration. The Nitinol tube 92 includes a hot inlet port 96, a hot outlet port 98, a cool inlet port 100, and a cool outlet port 102 that are in communication with an internal bore 104 (depicted by broken lines) that is defined through the Nitinol tube 92 and extends between the ends of the Nitinol tube 92. In accordance with alternate embodiments of the present invention, a plurality of compression facilities 52 are employed and work together. In accordance with other alternate embodiments of the present invention, the spring 94 is not employed and the Nitinol tube 92 functions to both open and close the arms 84.

Figure 6:
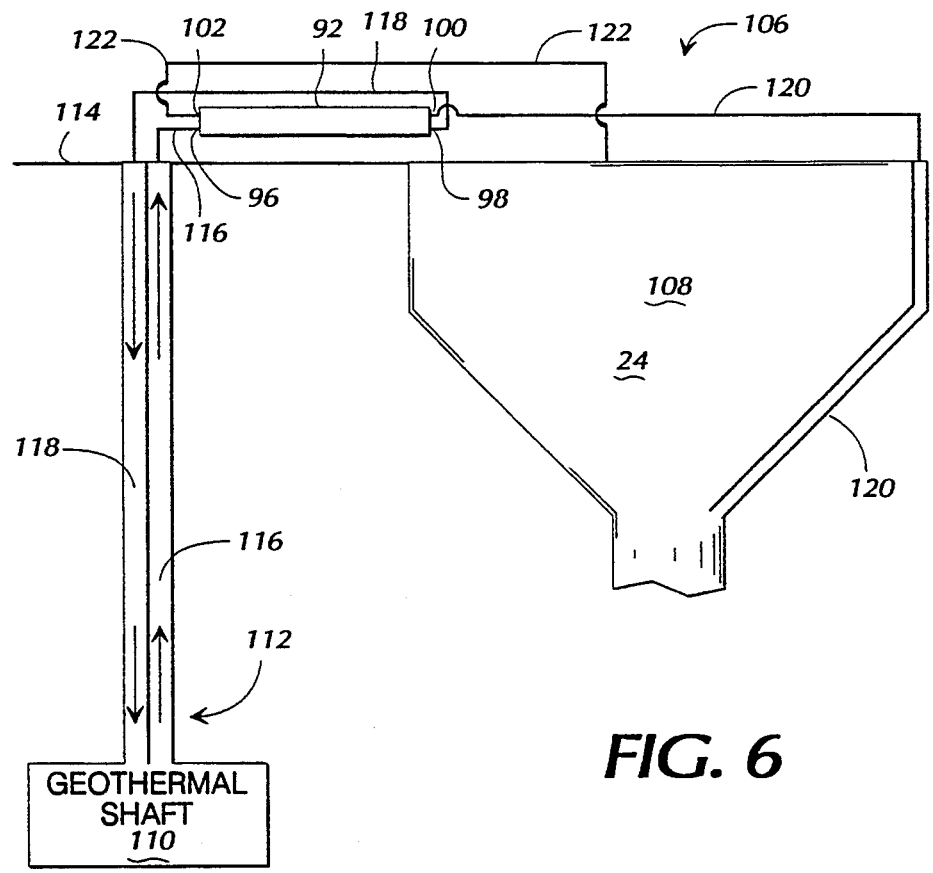
FIG. 6 is a schematic representation of a differential temperature system 106 that is part of the energy generating system of FIG. 1.

FIG. 6 is a schematic representation of a differential temperature system 106 that provides a differential temperature to the Nitinol tube 92, in accordance with the first embodiment of the present invention. The system 106 includes a cool temperature source 108 and a hot temperature source 110. In FIG. 6, the cool temperature source 108 is depicted as being the holding pond 24, and the hot temperature source 110 is depicted as being a geothermal shaft 112 that extends beneath the earth's surface 114 toward the earth's hot core. In accordance with alternate embodiments of the present invention, the hot temperature source 110 is a solar device or another source of heat. An inlet flow-path 116 is defined between the hot temperature source 110 and the hot inlet port 96 of the Nitinol tube 92, and an outlet flow-path 118 is defined between the hot outlet port 98 and the hot temperature source 110 to define a closed loop in which water preferably circulates. Pumps and control valves are incorporated into that closed loop so that warm water is, in a controlled manner, periodically passed through the internal bore 104 (FIG. 5) of the Nitinol tube 92 to cause the compression assembly 52 (FIGS. 1 and 4) to achieve the compressing configuration, as discussed in greater detail below. An inlet flow-path 120 is defined between the cool temperature source 108 and the cool inlet port 100 of the Nitinol tube 92, and an outlet flow-path 122 is defined between the cool outlet port 102 and the cool temperature source 108 to define a closed loop in which water preferably circulates. Pumps and control valves are incorporated into the flow paths 120,122 so that cool water is, in a controlled manner, periodically passed through the internal bore 104 (FIG. 5) of the Nitinol tube 92 to cause the compression assembly 52 (FIGS. 1 and 4) to achieve the ready configuration, as discussed in greater detail below. The flow-path 120 preferably draws water from the lower strata of the holding pond 24.

Figure 7:
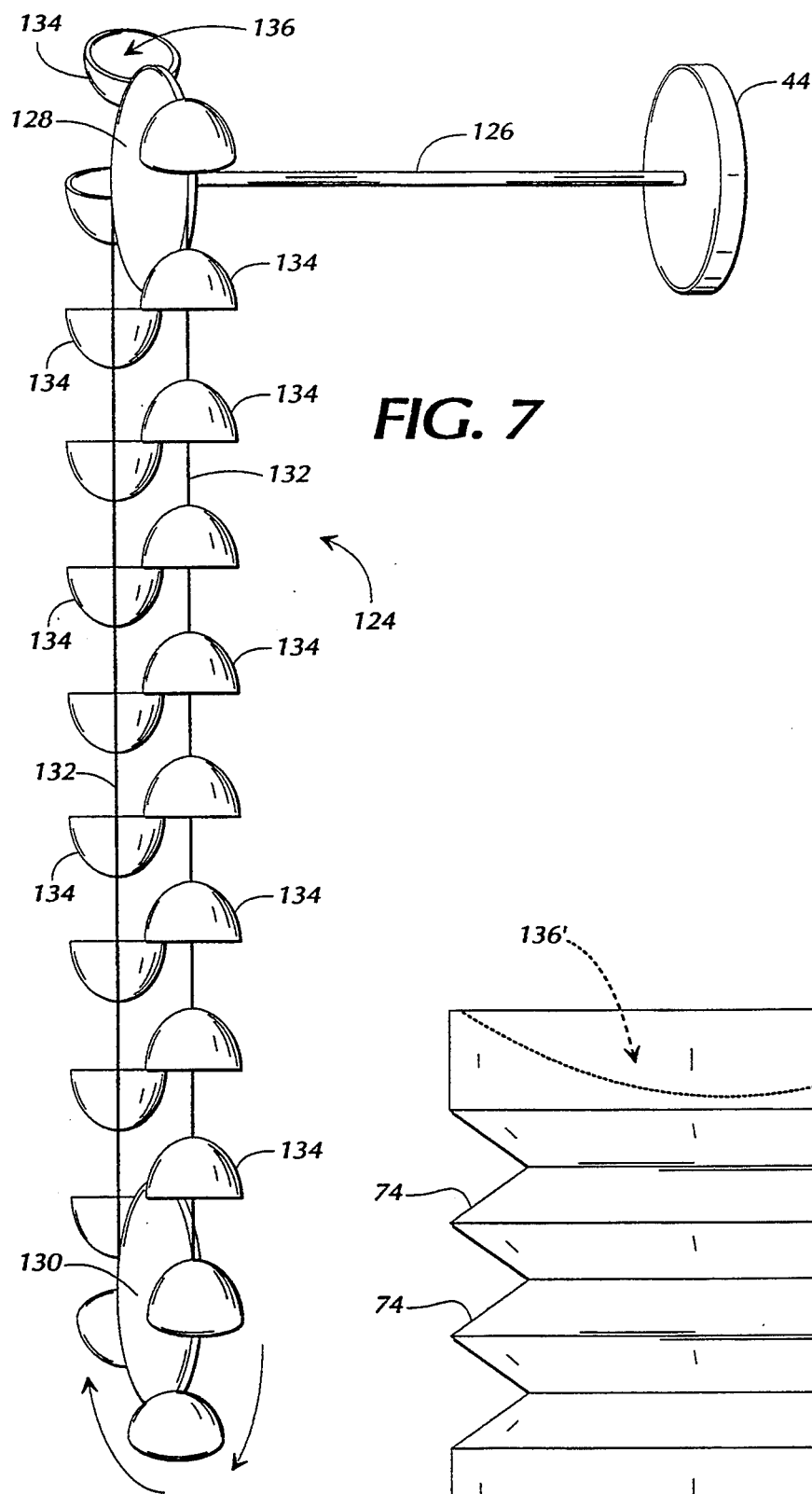
FIG. 7 is a schematic representation of a bucket system that is part of an energy generating system in accordance with a second embodiment of the present invention.
Figure 8:
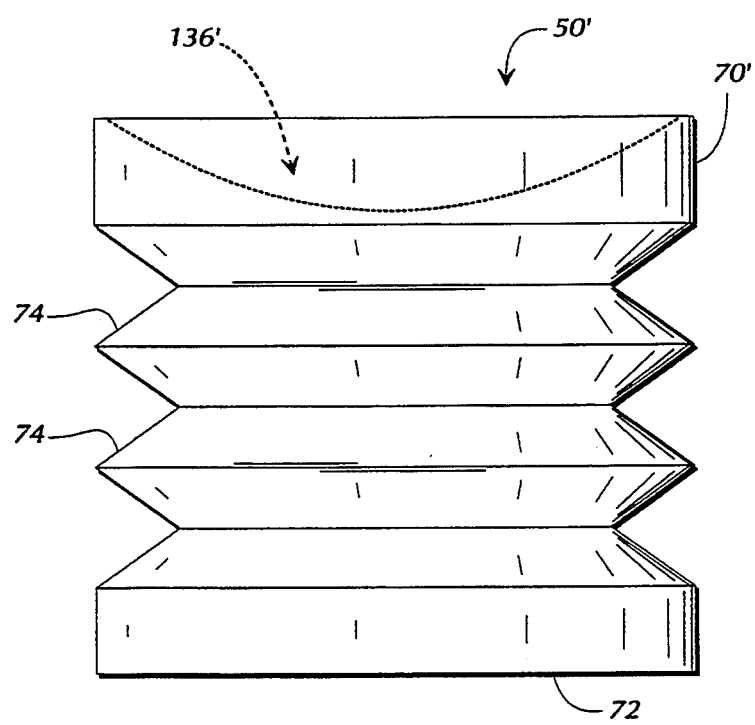
FIG. 8 is an isolated, representative, side elevational view of an inflation device that is part of an energy generating system in accordance with a third embodiment of the present invention.

FIG. 7 is a schematic representation of a bucket system 124 in accordance with a second embodiment of the present invention. In accordance with the a second embodiment of the present invention, the pump assembly 64 (FIG. 1) is not employed. Rather, the bucket system 124 is employed to lift water from the holding pond 24 to the elevated pond 25 (FIG. 1). The bucket system 124 includes an upper drive wheel 128 and a lower wheel 130 about which a loop member 132 extends. A plurality of buckets 134 are connected along the length of the loop member 132 and travel upward and downward with the loop member 132. The upper drive wheel 128 is connected by a drive shaft 126, or the like, to a roller 44 (FIG. 1) to facilitate movement of the loop member 132 in response to movement of the lift reactor 22 (FIG. 1). As depicted in FIG. 7, the loop member 132 moves in the direction indicated by an arrow depicted proximate to the bottom of the bucket system 124. Only several of the plurality of buckets are specifically pointed out in FIG. 6 in an effort to clarify the view. Referring momentarily to the bucket 134 depicted at the top of the bucket system 124, each bucket 134 defines a chamber 136 that fills with water from the holding pond 24 (FIG. 1) when a bucket is proximate to the bottom of the bucket system 124. Water dumps from the chambers 136 as the buckets pass over the top of the bucket system 124 and become inverted. The water is either dumped directly into the elevated pond 25, or into a sluice, or the like that leads to the elevated pond 25. Alternately, the water is dumped directly into a sluice, or the like, of the liquid deliver system 26 (FIG. 1), or directly into an intake reservoir 56 (FIG. 1). In accordance with a third embodiment of the present invention, neither the pump assembly 64 (FIG. 1) nor the bucket system 124 is employed. FIG. 8 is an isolated, representative, side elevational view of an inflated inflation device 50', in accordance with the third embodiment of the present invention. In accordance with the third embodiment, a chamber 136' is formed in the upper face plate 70' of each inflation device 50' such that as each inflation device 50' travels up from the holding pond 24 (FIG. 1) it carries water upward. The water carded upward in the chambers 136' is deposited, for example, into the elevated pond 25 (FIG. 1), a sluice, or the like, of the liquid delivery system 26 (FIG. 1), or directly into an intake reservoir 56 (FIG. 1). In accordance with a fourth embodiment of the present invention, the inflation devices 50 (FIGS. 1 and 3) are equipped with bags (not shown) that fill with water and function to lift and deposit the lifted water at the required elevated position.

Figure 9:
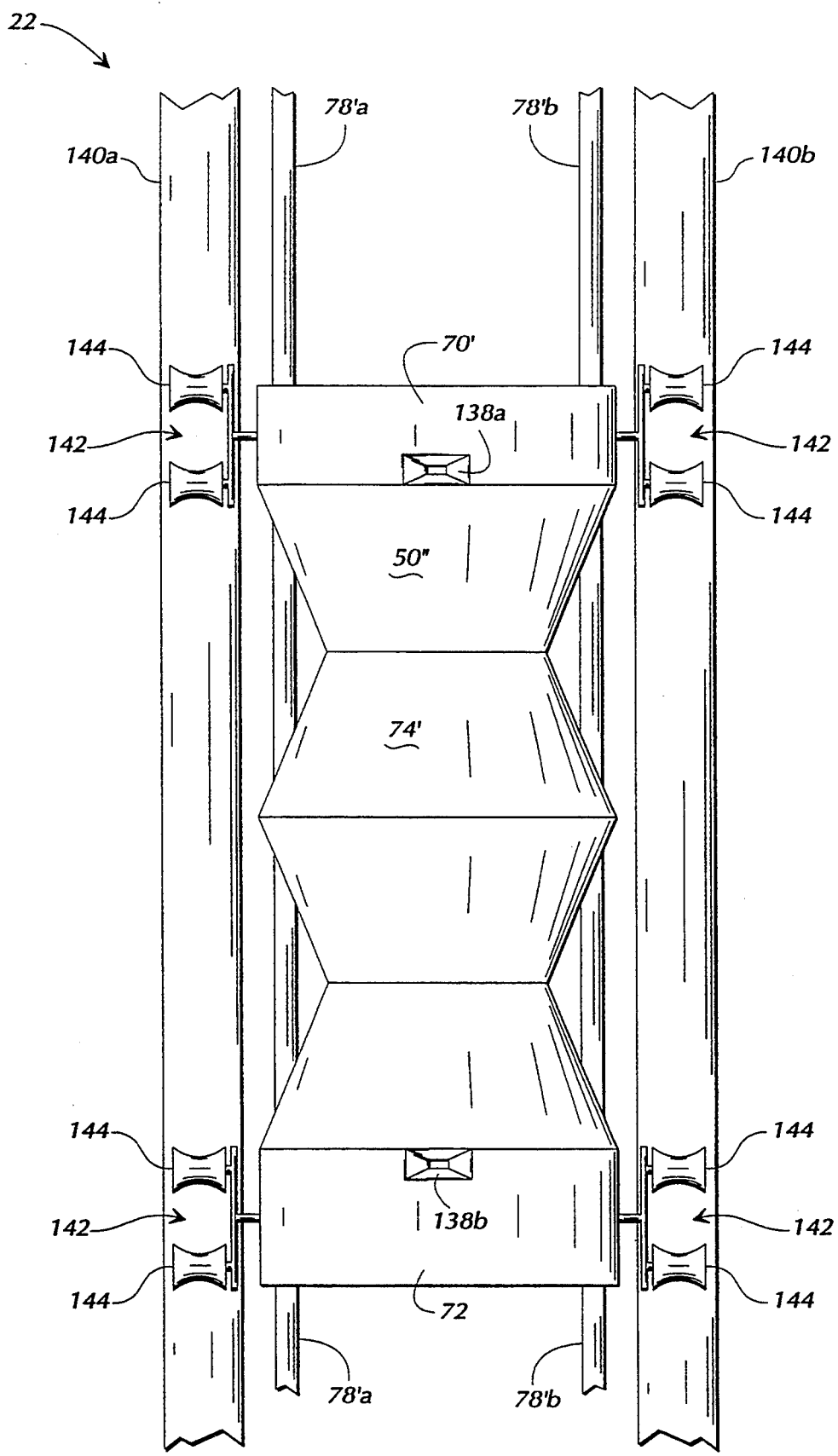
FIG. 9 is a cut-away view of a segment of a energy generating system in accordance with a fifth embodiment of the present invention.

FIG. 9 is a cut-away view of a segment of a lift reactor 22', in accordance with a fifth embodiment of the present invention. In accordance with the fifth embodiment, alternate inflation devices 50" are employed. The inflation device 50" depicted in FIG. 9 is shown inflated. The face plates 70", 72' each define a recess 138a,b respectively, for receiving the engagement plates 86a,b (FIG. 5), respectively, as will be discussed in greater detail below. Additionally, in accordance with an alternate embodiment, the face plates 70", 72' further include locking mechanisms that function to selectively maintain the inflation devices 50" in the closed configuration. The lift reactor 22' includes a pair of tracks 140a,b that are rigidly suspended and upon which the inflation devices 50" travel. The tracks 140 preferably define a loop that provides a travel path similar to that of the first embodiment of the present invention (FIG. 1). The inflation devices 50" include wheel assemblies 142 that engage the tracks 140 and allow the inflation devices 50" to travel relative thereto. The tracks 140 and wheel assemblies 142 are preferably conventional and of the type employed by roller coasters. Thus, while FIG. 9 depicts wheels 144, of the wheel assemblies 142, on one side of the tracks 140, there are also wheels 144 disposed on the opposite side of the tracks 140 that are not seen in FIG. 9, whereby the wheel assemblies 142 also function to secure the inflation devices 50" to the tracks 140. In accordance with the fifth embodiment, two primary tubes 78'a,b are employed. Not only do the primary tubes 78' function to allow for gaseous communication between inflation devices 50", the primary tubes 78' also function to connect neighboring inflation devices 50" to one another. The primary tubes 78' are acceptably connected solely to the upper face plate 70" of an individual inflation device 50" such that inflation and deflation is not restricted by the primary tubes 78'.

Referring back to FIG. 1, as mentioned above, the energy generating system 20 preferably functions to generate electricity. The energy generating system 20 is preferably utilized to generate energy on a large scale. For example, and not limitation, the components of the energy generating system 20 would preferable be large. More specifically, it is thought that the inflatable devices 50 might acceptably be ten feet high and define a diameter of forty feet, or be even larger. Alternatively, the energy generating system is capable of generating energy on a smaller scale, such that the inflatable devices 50 would be smaller than mentioned immediately above. As depicted in FIG. 1, the continuous loop member 48 of the lift reactor 22 encircles and moves clockwise with respect to the wall 31 of the pipe 30. The motive force that drives the loop member 48 is provided, in part, by the buoyancy of the inflated inflation devices 50. The inflation devices 50 are preferably inflated with air proximate to the pipe inlet 32. In accordance with alternate embodiments of the present invention, the inflation devices 50 are inflated with other gases such as, for example, helium. As depicted in FIG. 1, inflation devices 50d,e are inflated below the surface 36 of the holding pond 24, whereby inflation devices 50d,e provide a driving force that drives the loop member 48 and the other inflation devices 50a-c,f. The inflation devices 50a-c on the outside of the pipe 30 are not inflated so they do not totally off-set the driving force of inflation devices 50d,e. In accordance with the first embodiment of the present invention, the inflation devices 50 do not engage and seal against the wall 31 of the pipe 30 to transport liquid. Rather, contact between the inflation devices 50 and the wall 31 of the pipe 30 is preferably kept to a minimum in an effort to minimize forces that would tend to retard the desired movement of the inflation devices 50.

The inflation devices 50 passing on the exterior of the pipe 30 are deflated by the compression assembly 52 preferably just prior to their entry into the holding pond 24. Referring additionally to FIG. 5, as an inflation device 50 passes by the compression assembly 52, the inflation device 50 is interposed between the engagement plates of the 86 of the compression assembly 52 while the compression assembly is in the ready configuration as depicted in FIG. 5. Then, the differential temperature system 106 (FIG. 6) operates to heat the Nitinol tube 92 such that the compression assembly 52 achieves a compressing configuration. In the process of achieving the compressing configuration, the engagement plates 86 move toward one another to force the air from (i.e., deflate) the inflation device 50 positioned between the engagement plates 86. Once the inflation device 50 is deflated, the differential temperature system 106 (FIG. 6) operates to cool the Nitinol tube 92 so that the compression assembly achieves a ready configuration, whereby the engagement plates 86 are moved away from each other and positioned to receive the next arriving inflation device 50. In accordance with the first embodiment, the engagement plates 86a,b engage the upper face plate 70 (FIG. 3) and lower face plate 72 (FIG. 3), respectively of an inflation device 50, such that the inflation device is "squashed" from top to bottom. The reference plate 90 of the compression assembly 52 preferably pivots about a vertical edge thereof to achieve the proper orientation with respect to an inflation device 50. For example and not limitation, such pivoting is acceptably achieved by the action of a hinge (not shown) in combination with another piece of Nitinol (not shown) that is strategically heated and cooled by a portion (not shown) of the differential temperature system 106 to provide a motive force. Referring back to FIG. 9, in accordance with the fifth embodiment of the present invention, the engagement plates 86a,b (FIG. 5) fit into the recesses 138a,b respectively during compression. In accordance with another embodiment of the present invention, inflation devices 50 are "squashed" (i.e., compressed); the reference plate 90 does not pivot but rather inflation devices 50 travel in a path such that the inflation devices 50 simply travel into a position that is between the engagement plates 86.

As the compression assembly 52 compresses an inflation device 50, the air discharged from the compressed inflation device 50 is directed to the inflation device 50 that is entering the pipe inlet 32 (FIG. 1). Referring to FIG. 4, the transfer of air is carded out by way of the pneumatic system 76 by appropriately opening and closing pairs of valves 82. The opening and closing of valves 82 is acceptably facilitated by electronic valve operators that are controlled in a coordinated manner by, for example, a computer system. Alternatively, the opening and closing of the valves 82 could be triggered by mechanical actuating devices that are mounted, for example, to the tracks 140 (FIG. 9) such that as the inflation devices 50 pass by the mechanical actuating devices the valves 82 are properly actuated. For example, when the inflation device 50a is compressed, the inflation device 50d is inflated due to the fact that, during that compression, valves 82a,d are open whereas valves 82b,c,e,f are closed. Subsequent to that compression, all of the valves 82 are closed until inflation device 50b is compressed. During that compression, only valves 82b,e are open such that the inflation device 50e is inflated, and then all of the valves are closed. In a similar fashion the inflation device 50f is inflated when the inflation device 50c is compressed, the inflation device 50a is inflated when the inflation device 50d is compressed, inflation device 50b is inflated when the inflation device 50e is compressed, and inflation device 50c is inflated when the inflation device 50f is compressed.

While certain of the preferred and alternate embodiments of the present invention have been disclosed herein, other embodiments of the methods and apparatus of the present invention will suggest themselves to persons skilled in the art in view of this disclosure. Therefore, it will be understood that variations and modifications can be effected within the spirit and scope of the invention and that the scope of the present invention should only be limited by the claims below. It will also understood that any relative dimensions and relationships shown on the drawings are provided for example only and the scope of the invention is not to be limited thereby. Furthermore, the equivalents of all means-or-step-plus-function elements in the following claims are intended to include any structure, material, or acts for performing the function as specifically claimed which would be known by persons reasonably skilled in the art of this disclosure.

I claim:

1. A method of generating energy by employing a first body of water having a surface and defining a given depth, the method comprising the steps of:
   connecting a plurality of inflation devices to one another to form a loop of inflation devices;
   movably restraining the loop of inflation devices so that,
       a segment of the loop of inflation devices is disposed at a first reference location at the given depth in the first body of water,
       another segment of the loop of inflation devices is disposed at a second reference location disposed above the first reference location,
       another segment of the loop of inflation devices extends along a first path that extends generally upward from the first reference location to the second reference location, and
       another segment of the loop of inflation devices extends along a second path that extends generally downward from the second reference location to the first reference location;
   inflating inflation devices of the plurality of inflation devices within the first path with a gas; and
   deflating inflation devices of the plurality of inflation devices that are within the second path,
   whereby the inflation devices of the plurality of inflation devices within the first path move upward and the plurality of inflation devices within the second path move downward.

2. The method of generating energy of claim 1, wherein the step of deflating inflation devices includes, at least, exhausting a specific quantity of gas from an inflation device of the plurality of inflation devices that is proximate to the second reference point, and
wherein the step of deflating inflation devices includes, at least, filling an inflation device of the plurality of inflation devices that is proximate to the first reference point with the specific quantity of gas.

3. The method of generating energy of claim 1, wherein the method of generating energy further comprises the step of orienting an elongated pipe that defines an elongated bore vertically within the first body of water, and
wherein the step of movably restraining the loop of inflation devices further includes, defining the first path through the elongated bore of the elongated pipe.

4. The method of generating energy of claim 1, further comprising the step of employing the upward movement of the plurality of inflation devices within the first path to lift water from the first body of water to a second body of water that is above the first body of water.

5. The method of generating energy of claim 4, wherein the step of employing the upward movement of the plurality of inflation devices within the first path includes, at least,
   engaging a portion of water to a specific inflation device of the plurality of inflation devices within the first path when the specific inflation device is below the surface of the first body of water,
   moving the specific inflation device to a position above the surface of the first body of water, and
   discharging the portion of water from the specific inflation device to the second body of water.

6. The method of generating energy of claim 4, further comprising the steps of:
   directing, under the force of gravity, a stream of water from second body of water through a hydroelectric generating facility to generate electricity.

* * * * *